United States Patent
Schuhbauer

(10) Patent No.: US 7,571,869 B2
(45) Date of Patent: Aug. 11, 2009

(54) MINERAL LAYERED SILICATE IN THE FORM OF A NANOPOWER

(76) Inventor: Matthias Schuhbauer, Adolph-Kolping-Strasse 16a, Bogen (DE) 94327

( * ) Notice: Subject to any disclaimer, the term of this patent is extended or adjusted under 35 U.S.C. 154(b) by 260 days.

(21) Appl. No.: 11/596,201

(22) PCT Filed: May 13, 2005

(86) PCT No.: PCT/DE2005/000883

§ 371 (c)(1),
(2), (4) Date: Nov. 13, 2006

(87) PCT Pub. No.: WO2005/111154

PCT Pub. Date: Nov. 24, 2005

(65) Prior Publication Data

US 2007/0227403 A1     Oct. 4, 2007

(30) Foreign Application Priority Data

May 14, 2004   (DE) ............... 10 2004 023 992

(51) Int. Cl.
*B02C 19/00*   (2006.01)

(52) U.S. Cl. ............... 241/5; 241/19; 241/26; 241/27; 241/29

(58) Field of Classification Search ............ 241/5, 241/18, 19, 26, 27, 29
See application file for complete search history.

(56) References Cited

U.S. PATENT DOCUMENTS

| 3,951,850 A | * | 4/1976 | Clocker et al. ......... 516/79 |
| 5,934,575 A | * | 8/1999 | Ohnishi et al. ......... 241/5 |
| 6,872,444 B2 | * | 3/2005 | McDonald et al. ...... 428/206 |

* cited by examiner

*Primary Examiner*—Mark Rosenbaum
(74) *Attorney, Agent, or Firm*—Hoffman Wasson & Gitler, P.C.

(57) ABSTRACT

In the production of a mineral product that consists of aluminum layer silicate and corresponding fines with an at least 70% proportion of the mineral illite of the selected type, the starting material in its natural composition is pre-broken, the agglomerated layer silicate particles are subjected to a deagglomeration at a high acceleration rate and swirled using strong air masses, the agglomerates are broken up into primary crystallites by being slammed against one another and against impact surfaces, the deagglomerated layer silicate particles are drawn off by fine sifting and the deagglomerated particles are returned to the cycle, and the deagglomerated primary crystals are drawn off.

11 Claims, No Drawings

MINERAL LAYERED SILICATE IN THE FORM OF A NANOPOWER

BACKGROUND OF THE INVENTION

The invention relates to the conditioning of naturally occurring layer silicates, in particular in the form of illitic raw materials with an illite proportion of more than 70% and defined fines.

Layer silicates have a particle fineness in the range of <2 µm (this value is characteristic of the grain fineness of clay minerals), whereby the actual particle finenesses can range, depending on the degree of definition of the particles, into more significantly fine areas, up to nanoscale values.

In the case of layer silicates with technically advantageous small plate structures, in general a distinction is made between two-layer silicates (kaolinite) and three-layer silicates (smectite, illite). In particular, the three-layer silicates offer defined particle finenesses. In this case, in general the smectite group types are used technically and commercially. For this group, relatively high occurrences of deposits with sufficient purity and with well-formed fineness exist. The typical swelling capacity of this special silicate structure is used for the deagglomeration, i.e., the separation of the individual particles from one another, with the aid of chemical processes.

The illite group essentially comprises the types of muscovite and mica that are used technically and commercially. Their rock-like definition requires a proper crushing process; in particular, they do not have the plastic characteristic of clay-mineral materials such as kaolinite and smectite.

Production of nanoscale particles is theoretically possible because of the smaller definition (produced by the decomposition in the development), but for practical reasons more likely cannot be used due to commercial and industrial considerations owing to the processing cost for the manufacture of sufficiently large production amounts and the high degree of chemical input required. The nanoscale value is limited, moreover, to the thickness of the small plates, while the surface area remains microscopic. Muscovite and mica are classified macroscopically in the case of mineralogical examination. Muscovite and mica of the illite group are generally direct decomposition products of the initial rock. In contrast to this, the actual clays are moved to secondary deposits. In this rearrangement, first the fine clay sediments are developed by mechanical, hydrothermal and chemical processes that form the prerequisite for nanoscale particles.

Corresponding to this particle fineness of these clays, the three-layer minerals, such as smectite and illite, are considerably finer than the two-layer minerals, e.g., kaolinite. With respect to nanoscale clay minerals, practice thus focuses on smectitic raw materials, since the latter are present in deposits that can be exploited quantitatively with adequate degrees of purity. Correspondingly finely-formed illite with higher degrees of purity, however, virtually does not occur or occurs only to a very limited extent. The general literature regarding clay minerals thus is concentrated on smectite material with respect to industrial use, in particular in the highly technical range and relative to nanoscale products.

In the prior art, reference is made to DE 100 61 232 A1, which relates to a process for production and preparation of Laist for medical applications, in particular for treatment of skin diseases. In this connection, this is the special use of a specific mineral-matter mixture that contains clay-mineral portions that can be of illitic definition, whereby the clay-mineral components are coincidentally illite, but not in concentrated form. In this connection, a clayey component that is used as a plastic matrix and that must not be deagglomerated is critical. The Laist represents an absolutely hydrogenic mineral mixture with a plurality of components, whereby clay as a defined material can have up to more than 60% sand. Here, this is a completely different raw material with basically different properties and goals of use, whose proportions of salt have nothing in common with a layer silicate. In addition, there is a significant difference in the processing with washing. The state of the prepared product as a paste represents another basic difference to a nanopowder.

DE 29 50 248 C2 relates to the production of multicomponent masses with the purpose of a homogenization of several components in a usable mass. This aim is not comparable to that according to this invention since in the case of the invention, the procedure is performed with a single component that is as pure as possible and that is to be crushed very finely into its primary components. According to this known proposal, the product is greatly wetted so that a special processing technique can be used. This processing technique uses known machines and devices such as, e.g., impact mills and classifiers. The milling fineness in this case is indicated with 90 µm, and the milling process proceeds in terms of a crushing process.

US 2002/45010 A1 relates to a special, concentrated application oriented to a synthetic material, especially the coating of surfaces. The basic material has only a very distant relationship to illite. The material base is hectorite as a clay-mineral material, and the description refers to the availability of nano-capable materials, so that logically, illite is thus also mentioned, which in practice has no corresponding application. The material hectorite is to be assigned to another group, namely the group of smectites. In this connection, this is a synthetically produced material, which, even from the standpoint of chemism, is specially oriented toward the exchange of Mg for Li, i.e., it has no relation to a pure, natural material.

EP 1 394 197 A1 relates to highly-viscous molding compounds that are suitable for the extrusion-blow-molding process and are based on thermoplastic polymers from the group that consists of polyamides, polyesters, polyether esters, polyester amides or mixtures thereof and nanoscale fillers, i.e., fillers with an average particle size in the range of <1 µm. The object to be achieved consists in making available highly-viscous molding compounds based on thermoplastic polymers that can be produced easily, are suitable for the extrusion-blow-molding process and in addition still have adequate strength at temperatures of 150-200° C. This object is achieved by highly-viscous molding compounds based on thermoplastic polymers that contain (a) nanoscale fillers in an amount of 0.5-15% by weight as well as (b) fiber-like filling materials in amounts of 5-30% by weight. The filler particles in this case have dimensions in the nanometer range, i.e., with a mean particle size of <1 µm (untreated fillers). As nanoscale fillers for the production of nanocomposites, such substances that can be added at any stage of production and in this case can be finely dispersed in the nanometer range are suitable. These nanoscale fillers are surface-treated but also are untreated fillers. The fillers are preferably minerals that already have a layer structure, such as layer silicates, double hydroxides or else graphite. The nanoscale fillers that are used in this connection are selected from the group of oxides, oxide hydrates of metals or semi-metals, in particular from the group of oxides or oxide hydrates of an element selected from the group that consists of boron, aluminum, calcium, gallium, indium, silicon, germanium, tin, titanium, zirconium, zinc, yttrium or iron. In addition, the nanoscale fillers are either silicon dioxide or silicon dioxide-hydrates. Nanoscale fillers that are in the polyamide molding compound [exist] in an embodiment as a uniformly dispersed layered material. As preferred minerals with a layer structure, layer silicates, double hydroxides, such as hydrotalcite or graphite, just like nanofillers based on silicones, silicon or silsesquioxanes, are indicated.

One skilled in the art gathers from this patent specification that basically all layer silicates are suitable but only synthetic or synthesized materials and the smectites that can swell are used for processing or are produced correspondingly in nanoscale. In this case, reference is clearly made to the necessity for chemical additives to achieve an exfoliation in a later manufacturing process. The basic delineation relative to this invention with respect to starting material, processing and properties follows from the above.

Further, in this patent specification, the nanoscale values are again indicated in a size range of, on the average, <1 µm. The material according to the invention is specified with an above-average value of <300 nm (0.3 µm) or with D50<150 nm (0.15 µm). That is to say, in terms of the nanoscale level, the material according to the invention differs from the prior art relative to natural mineral layer silicates by almost a full order of magnitude.

For the applicant and inventor of this application, it turned out, based on the corresponding previous works, that a desired mineral material with a layer structure would essentially have to meet the following requirements and exhibit the following properties:
 a) The suitability for the production of a nanoproduct,
 b) The achievement of an end product based on a natural raw material,
 c) The property of a layer silicate with a three-layer structure, which in particular has no swelling capacity or in any case little swelling capacity,
 d) A complete deagglomeration capability in the manufacture of products,
 e) The processibility and conditioning without preliminary heat treatment,
 f) The processing without the use of chemical or synthetic processes.

SUMMARY OF THE INVENTION

In the search for and tests with suitable layer silicates with respect to the nanoscale, applicants and inventors came upon a deposit with unusually pure and extremely finely-formed illite (referred to below as "illite of the selected type"), which has the above-mentioned objectives or properties of the desired material to a large extent and offers the possibility of deforming the material directly into a nanopowder by processing and conditioning steps according to the invention. The raw material characteristic of the latter as a suitably found material is decisively determined by a layer silicate portion that shows an extremely fine definition in the direction of <300 nm, a completely defined illite proportion of >70% and the almost complete lack of coarse hard materials. This conditioning is carried out according to the invention in a purely mechanical manner, dry and without preliminary heat treatment, without milling in terms of destroying crystalline structures, economically in the industrial scope and with existing, specially selected technology. In this case, with the illite of the defined type, a free-flowing, fine-powder product was achieved without drying and without crushing while preserving the full plasticity by avoiding the loss of the water of crystallization and the destruction of the small plate structure, and, contrary to all expectations and previous findings, with use of the conventional technology, the product fineness necessary for a nanoproduct was achieved. In contrast to this, the achievement of corresponding finenesses in the nanorange of <300 nm has previously been possible only by washing or intensive milling (in terms of the destruction of crystalline structures, such as, e.g., mica) and with use of considerable amounts of chemical additives. This brings about an especially high technical and economical expense for an industrial production. Since in the case of conventional comparable processes, the use of chemicals is virtually unavoidable, the goal-oriented adaptation of the particles for the rest of the manufacturing process at the customer site is limited and is negative from the ecological standpoint.

Illite is distinguished by its special particle fineness up to the colloidal range as an especially suitable raw material for the product objective according to the invention. Since illite generally is not completely defined as the colloidal layer silicate, however, and usually also does not have high purity, the objective had not previously been set and also had not been realized.

Known nanoscale clays are generally based on smectitic material, such as, e.g., montmorillonite and bentonite. Such a material is prepared with preliminary heat treatment, which results in the elasticity of small plate structures by losses of water of crystallization. This is disadvantageous in particular for a sensible use in the range of technical ceramics, but also for the swelling capacity. In this case, no or no complete deagglomeration is reached, but rather an "exfoliation" in the process of the applicant is necessary with the aid of essential chemical additives and with use of the swelling capacity, i.e., the successful use is up to the customer and special processing techniques and additional energy are required.

DETAILED DESCRIPTION OF THE INVENTION

For the preparation, conditioning and production processes according to the invention, a deagglomeration of the agglomerated layer silicate particles is of decisive importance, while the original composition of the material must be maintained both in the chemical and in the mineralogical respect; primarily the process is performed in the dry state, and in principle washing should not be ruled out, the layer silicate particles are not crushed (in terms of destruction), by the deagglomeration of the layer silicate crystallite, no significant influence on the form and structure of the material is exerted, chemical and heat treatments are omitted, and no adding or removal of substances to and from the material is carried out.

The starting product of the illitic raw material of the selected type is added mechanically "pre-broken" (while maintaining its mineral structure) in a deagglomeration device. To perform the deagglomeration, the coarse agglomerates are greatly accelerated and swirled with large air masses. The agglomerates are broken up by colliding with one another and by striking against impact surfaces under a slamming action, such that essentially primary crystallites are present, whereby by conditioning, the product is deagglomerated and the predominant amount of primary particles is about <300 nm. In a downstream fine sifting, the deagglomerated layer silicate particles are drawn off as the desired product, so that damage of these crystallites is prevented. The incompletely deagglomerated particles are recycled in the deagglomeration process as coarse material. Then, the degree of deagglomeration is increased by the specific production of the fine product. This can be optimized by different types of internals in the deagglomeration aggregates to achieve a longer dwell time or a greater slamming action.

To perform the process according to the invention, the starting material is pre-broken with the aid of conventional machines, e.g., roller crushers. For fine sifting, high-performance air separators with special separator wheels adapted to this material are used. For the deagglomeration process, preparation machines are used that exert a slamming action on the agglomerates. Such preparation machines can be impact mills, compressed-air mills, pin mills or ball mills. The use of special flat-disk mills, e.g., clay-decomposing mills according to the Eirich System, with serrated grinding surfaces, has turned out to be especially advantageous, however, in terms of performance and results. At the prevailing high rpm, the large number of interspaces between the grinding surface fluting in this case form fine chambers for eddying and produce a high slamming action relative to the special object material. The slamming action and the dwell time can be further enhanced by different mechanical internals.

The results that are achieved in this connection relative to the product fineness have met the objective of reaching the nanorange. Contrary to all expectations and previous findings, this was virtually achievable with conventional technology with results that were highly surprising to experts.

With the aid of opposed-jet mills, finenesses up to <150 nm were unexpectedly achieved. In this case, for a corresponding fineness yield, it was usually run in a circuit with classifiers. The result was a virtually residue-free yield. Analysis via electron microscope showed a good and unhindered small plate structure and confirms the nanoscale values. The production amounts per time unit were in this case limited and costly, however.

Based on the specifically performed development tests, it was found that in a mechanical way with significantly more efficient machines, which also can be used according to the impact principle, high concentrations corresponding to finer particles can be achieved, and the larger particles represent residual agglomerates to a very large extent. Surprisingly enough, the impact principle functions extremely well and with the highest fine particle concentrations in the flat-disk mill. Here, the stable, rod-shaped agglomerates of the special illite of the selected type deagglomerate especially well. In this connection, the rolled molds of the smectites do not entail the requirements. In a way similar to the process of the opposed-jet mill with the corresponding technical experience with use of the special illite of the selected type, the possibility of sifting the finest portions and a re-introduction of residual agglomerates in the cycle was produced. In this case, the high fines make possible a virtually realizable production.

With the process according to the invention and with use of illite of the selected type, an absolute nanopowder can be produced as a direct product. Such a nanopowder, produced in a completely unusual way, based on illite of the selected type is correspondingly deagglomerated in nanoscale even in the product state so that it can be dispersed in especially good and high portions in, e.g., polymer systems. In this case, practical experience shows that the processing expense is significantly less, and considerably better property values (in comparison to nanoclays) are achieved. In addition, it is possible to dispense with burdensome chemistry and to use the surface activity of the illite particles in a system-relevant way.

In contrast, in the case of the nanoclays, the typical swelling capacity of the smectites is used to expand them chemically and to carry out an exfoliation in the process of the customer who undertakes further processing. Thus, the illites of the selected type that cannot swell have the advantage, however, that they do not experience any corresponding changes in volume in the case of corresponding stresses, which is a decisive advantage in particular in ceramics.

The product that is produced according to the invention is distinguished in that it represents a pure mineral, natural, finely-conditioned layer silicate, has a three-layer crystal structure, essentially cannot swell, contains the mineral illite with a proportion of more than 70% as a main component, whereby the residual proportions are defined fines, a solid, powdery aggregate state and a particle diameter of <300 nm, and is reactive relative to ion exchange and charge.

In addition, this material that is produced with the invention for use in practice has significant inherent properties of pourability and flowability with no dust formation, little tendency to reagglomerate and no hygroscopic tendency, and high wetting capacity, and is thus capable of homogenization and is suitable for safe use.

Below, an example of an average chemical composition of the illite of the selected type according to the invention is provided, whereby the proportions in % by weight are indicated:

| | |
|---|---|
| $SiO_2$ | 46.00 |
| $Al_2O_3$ | 20.00 |
| $Fe_2O_3$ | 7.00 |
| CaO | 6.00 |
| $K_2O$ | 5.50 |
| MgO | 3.00 |
| $Na_2O$ | 0.15 |
| $TiO_2$ | 0.80 |
| $P_2O_5$ | 0.30 |
| GV | 11.00 |

The structural formula of this composition reads:

$$(K, H_3O)(Al, Mg, Fe)_2(Si, Al)_4 O_{10}[(OH)_2(H_2O)]$$

What is claimed is:

1. A process for mechanical conditioning of an extremely pure, natural, mineral layer silicate material, with a layer silicate proportion of >70% with the exclusion of preliminary heat treatment, destruction of crystalline structures and/or chemical or synthetic processes, in a fineness of 100-600 nm in the nano-range, in which the mechanical conditioning comprises the steps of:
    a) the material of the selected type as a mineral product of the highest purity is prebroken mechanically while maintaining the original, natural composition in the chemical and mineralogical respect thereby forming silicate particles with coarse agglomerates,
    b) the silicate particles are subjected to a deagglomeration process, with the coarse agglomerates being subjected to high acceleration and swirled with the aid of considerable air masses,
    c) the coarse agglomerates are broken up by being slammed against one another and against impact surfaces and in this case until primary crystallites with a degree of fineness of >about 300 nm are present,
    d) the deagglomerated layer silicate particles are drawn off by downstream fine sifting forming deagglomerated primary crystals, and
    e) incompletely deagglomerated particles are returned to the deagglomeration process and the deagglomerated primary crystals are drawn off, and for conditioning, the natural composition of the product is maintained in the chemical and mineralogical respect, the layer silicate particles are not exposed to any crushing destroying the crystal structure, and the layer silicate crystals remain unaffected in terms of their form and structure.

2. The process according to claim 1, wherein the prebreaking is carried out with the aid of conventional mechanical devices, or, roller crushers.

3. The process according to claim 1, wherein the fine sifting is performed by means of high-performance air separators with special separator wheels.

4. The process according to claim 1, wherein the deagglomeration with the aid of preparation machines is performed, with a slamming action that is exerted on the agglomerates.

5. The process according to claim 1, wherein the degree of deagglomeration is increased by the specific discharge of the fine product.

6. The process according to claim 5, wherein the specific discharge of the fine product is increased, wherein in the deagglomeration aggregates, and wherein precautions are taken to achieve a longer dwell time and/or a greater slamming action.

7. The process according to claim 1, wherein for conditioning, the natural composition of the product in chemical and mineralogical respect is maintained, wherein the layer silicate particles are not exposed to crushing destroying the crystal structure, wherein the layer silicate crystallites remain unaffected in terms of their form and structure, and wherein the material is not exposed to any chemical treatment or preliminary heat treatment.

8. A process according to claim 1, wherein for deagglomeration of the material, preparation machines in the form of impact mills, compressed-air mills, pin mills, ball mills are used.

9. The process according to claim 8, wherein the preparation machines are flat-disk mills with serrated grinding surfaces and wherein the interspaces between the grinding surface fluting are designed as fine chambers for eddying at high rpm and with high slamming action.

10. The process according to claim 8, wherein the pre-breaking is carried out with the aid of roller crushers.

11. The process according to claim 8, wherein the fine sifting is carried out with high-performance air separators.

* * * * *